United States Patent
Massard (10) Patent No.: US 10,935,866 B2
(45) Date of Patent: *Mar. 2, 2021

(54) OPTICAL MODULATOR

(71) Applicant: eLstar Dynamics Patents B.V., Rockanje (NL)

(72) Inventor: Romaric Mathieu Massard, Eindhoven (NL)

(73) Assignee: ELSTAR DYNAMICS PATENTS B.V., Rockanje (NL)

(*) Notice: Subject to any disclaimer, the term of this patent is extended or adjusted under 35 U.S.C. 154(b) by 0 days.

This patent is subject to a terminal disclaimer.

(21) Appl. No.: 16/834,588

(22) Filed: Mar. 30, 2020

(65) Prior Publication Data

US 2020/0249539 A1   Aug. 6, 2020

Related U.S. Application Data

(63) Continuation of application No. 16/778,002, filed on Jan. 31, 2020, now Pat. No. 10,852,616.

(30) Foreign Application Priority Data

Feb. 4, 2019   (NL) ..................................... 2022504

(51) Int. Cl.
| | | |
|---|---|---|
| *G02F 1/167* | (2019.01) | |
| *G02F 1/16755* | (2019.01) | |
| *G02F 1/1685* | (2019.01) | |
| *G02F 1/16761* | (2019.01) | |
| *G02F 1/1676* | (2019.01) | |
| *G02F 1/1675* | (2019.01) | |

(52) U.S. Cl.
CPC ............ *G02F 1/167* (2013.01); *G02F 1/1676* (2019.01); *G02F 1/1685* (2019.01); *G02F 1/16755* (2019.01); *G02F 1/16761* (2019.01); *G02F 2001/1678* (2013.01)

(58) Field of Classification Search
CPC .......... G02F 1/155; G02F 1/165; G02F 1/166; G02F 1/167; G02F 1/16757; G02F 1/1676; G02F 1/1685
USPC .......................... 359/252, 253, 254, 265, 266
See application file for complete search history.

(56) References Cited

U.S. PATENT DOCUMENTS

| | | | | |
|---|---|---|---|---|
| 6,618,109 B2* | 9/2003 | Hidehira | ........... | G02F 1/134363 349/141 |
| 7,177,002 B2* | 2/2007 | Matsumoto | ....... | G02F 1/134363 349/141 |

(Continued)

FOREIGN PATENT DOCUMENTS

| | | | |
|---|---|---|---|
| WO | WO 2008/012934 A1 | 1/2008 | |
| WO | WO-2017026480 A1 * | 2/2017 | ............. G02F 1/166 |

OTHER PUBLICATIONS

Non-Final Office Action, issued in U.S. Appl. No. 16/778,002, dated Jun. 19, 2020, pp. 1-20, U.S. Patent and Trademark Office, Alexandria, VA.

(Continued)

*Primary Examiner* — Nicholas R. Pasko
(74) *Attorney, Agent, or Firm* — Brinks Gilson & Lione (57) ABSTRACT

An electrophoretic device for switching between a transparent and non-transparent mode comprises a fluid and particles, electrodes for moving said particles, and various further elements, as well as uses thereof, in particular as a window blind.

18 Claims, 2 Drawing Sheets

(56) References Cited

U.S. PATENT DOCUMENTS

| | | | |
|---|---|---|---|
| 7,362,400 B2* | 4/2008 | Itou | G02F 1/134363 349/114 |
| 8,054,535 B2* | 11/2011 | Sikharulidze | G02F 1/167 359/296 |
| 8,384,659 B2* | 2/2013 | Yeo | G02F 1/167 345/107 |
| 8,514,481 B2* | 8/2013 | Yeo | C09D 11/52 359/296 |
| 8,520,286 B2* | 8/2013 | Clapp | C09B 69/108 359/270 |
| 9,013,780 B2 | 4/2015 | Henzen et al. | |
| 9,075,281 B2* | 7/2015 | Kato | C09B 23/04 |
| 9,176,347 B2* | 11/2015 | Peng | G02F 1/134363 |
| 2005/0185104 A1* | 8/2005 | Weisbuch | G02F 1/167 349/16 |
| 2011/0304529 A1 | 12/2011 | Yeo et al. | |
| 2015/0268593 A1 | 9/2015 | Sasaki et al. | |
| 2016/0071465 A1* | 3/2016 | Hung | G09G 3/344 345/107 |
| 2016/0187755 A1* | 6/2016 | Kasegawa | G02F 1/133514 359/296 |
| 2017/0061895 A1* | 3/2017 | Paolini, Jr. | G09G 3/344 |
| 2018/0116712 A1 | 5/2018 | Dong et al. | |
| 2018/0239211 A1* | 8/2018 | Teranishi | G09G 3/3446 |
| 2019/0302564 A1 | 10/2019 | van de Kamer | |

OTHER PUBLICATIONS

International Search Report and Written Opinion for PCT/EP2020/052379 dated Mar. 25, 2020.

Notice of Allowance, issued in U.S. Appl. No. 16/778,002, dated Aug. 3, 2020, pp. 1-9, U.S. Patent and Trademark Office, Alexandria, VA.

* cited by examiner

OPTICAL MODULATOR

RELATED APPLICATIONS

The present patent document is a continuation of U.S. patent application Ser. No. 16/778,002, which was filed on Jan. 31, 2020, and which claims the benefit of foreign priority to Netherlands Patent Application No. 2022504, which was filed on Feb. 4, 2019. Both of the aforementioned patent applications are hereby incorporated by reference in their entirety.

TECHNICAL FIELD

The present disclosure is directed to an electrophoretic device for switching between a transparent and non-transparent mode, comprising a fluid and particles, electrodes for moving said particles, and comprising various further elements, as well as uses thereof, in particular as a window blind.

BACKGROUND INFORMATION

Electronic display devices and especially electrophoretic display devices are typically pixilated display devices in which charged pigment particles are moved vertically to generate a required pigmentation of a pixel. In a first approach thereof black and white particles are encapsulated, defining a closed space wherein black particles move upwards at the same time when white particles move downwards, or vice versa; so, either the white or the black particles are visible and hiding the other type at the same time; a transparent state is not possible. Pigment particles cannot freely move, as they are enclosed in microcapsules. The pigment particles are relatively large, typically larger than 500 nm (0.5 µm), and on average 1 µm or larger. The two electrodes typically used are located above one and another. Switching is achieved by an electric field, the particles typically being charged or chargeable; this type of display device is often referred to as E-ink, such as described in US2002/167500 A1. The microcapsules, typically made of plastic, are relatively small (30 µm). By applying a color filter a color may be provided. Colored particles are being developed and may be driven electrically accordingly. Switching is relatively fast (within 300 mseconds), the stability is good (above 10 seconds), and the contrast is good as well. Stacks of layers can typically not be formed due to the inherent presence of microcapsules being either in a white or black status, i.e. always providing a "color".

In an alternative technique the colored particles can move more freely throughout a pixel, largely independently of one and another. The colored particles move from one location, in the pixel, to another location, also typically due to an applied electrical field. A first location is typically where particles accumulate, has a high density or concentration, whereas a second location is where particles are spread out, typically evenly, having a lower concentration or density, thereby providing the impression of coloring. The area of the first location, often referred to as accumulation area, is relatively small. Switching is achieved by moving particles from the accumulation electrode to the second, field, electrode. By agglomerating the particles towards the accumulation area the transparency of the display is changed. In a top view the field area and accumulation area are located adjacent to one and another, contrary to the E-ink approach.

For further details of present developments in this field as well as for drawbacks of the present technology reference is made to recently filed NL2010936, which reference is incorporated herein by explicit reference. A main difference compared to other technologies is that the colored particles are always visible. Some details are provided below.

A benefit of the lateral switching of charged particles is that the electrophoretic display device may comprise a fully transparent state. In principle a choice of reflector or possibly backlight is possible.

However, in an electrophoretic display it is relatively difficult to control the electrical field and particle motion distribution accurately enough to provide a homogenous pixel absorbance in the "dark" state as well as to fix the particles in the "light" state to an electrode.

Also switching from a first state to a second state in the above display may be relatively slow; typically too slow for many applications, even with recently improved devices. It is noted that typically prior art particles move at a speed of less than about 0.1 mm per second, which is considered at least ten times too slow for certain applications.

For full color displays, which may comprise a stack of the above pixels, the situation is clearly even worse.

It is noted that various pixel layouts exist. An issue with electrophoretic displays is lifetime, especially for the electrodes. Obtaining a stable configuration for e.g. a pixel has been found difficult, especially in view of electrical fields being provided. In addition, it remains difficult to have good switching times and stability.

In general it is noted that the electrophoretic pixels are relatively difficult in terms of modeling. Simple calculations, such as linking fluid viscosity and applied field, do not apply well in practice. Such is reflected by the fact that major companies have been trying to develop electrophoretic pixels unsuccessfully over the years.

BRIEF SUMMARY

The present disclosure relates in a first aspect to an optical modulator, in a second aspect to a product comprising said optical modulator, and in a third aspect to a method of operating said optical modulator. The present disclosure provides a very different mode of operation, at different conditions, wherein a pulsed mode is used for applying an electrical field and with a good conducting material as electrode. The present optical modulator is for switching between a transparent state and an at least partly non-transparent state and vice versa, wherein in the non-transparent state typically >70% of the light is blocked, such as >90%, from passing through the modulator, and wherein in a transparent state most of the light is let through. In the non-transparent state one could still look through the optical modulator and perceive images at another side thereof. The optical modulator comprises a first and a second substrate (11, 12), wherein the substrates are optically transparent, typically >95% transparent at relevant wavelengths, such as >99% transparent. At least two electrodes 13, 14 are provided at an internal side of the substrates. These electrodes are for driving particles. A fluid 15 is provided in between said substrates, the fluid comprising nanoparticles and/or microparticles, wherein the particles are electrically charged, and can be driven by an electrical field to move towards or away from electrodes, depending on a potential applied. The particles are adapted to absorb light and therewith preventing certain wavelengths from passing through. Further a connection for applying an electro-magnetic field to the electrodes is provided, wherein in use the applied electro-magnetic field to the electrodes provides movement of the nano- and microparticles from a first electrode to a second electrode and vice versa. The present optical modulator is characterized in that the electrodes comprise an electrical conducting material with a resistivity of less than 100 nΩm (@273K; for comparison typically used ITO has $10^5$ nΩm), which is similar to an electrical conductivity >$1*10^7$ S/m @20° C.). As a further characterization also resistivity per unit area (Ohms per square, Ω/☐) may be used; then a value of less than 80Ω/☐ (@273K) is good, preferably less than 60Ω/☐, more preferably less than 10Ω/☐, such as less than 2Ω/☐. So good conducting materials are used in this respect; further in that the at least two electrodes are adapted to provide a lateral electrical force between said electrodes, that is particles move in a mostly horizontal direction, parallel to the substrates. Further in a power provider in electrical connection with the at least two electrodes, wherein the power provider is adapted to provide a waveform power, wherein at least one of amplitude, frequency, and phase is adaptable, and wherein the electrodes are in fluidic contact with the fluid, which contact may be directly (fluid in contact with the electrode) or indirectly (fluid in contact via a second medium with the electrode, such as through a porous layer), and wherein electrodes cover 1-30% of the substrate surface. Surprisingly stable electrodes are obtained with this configuration, i.e. operation can be maintained over long periods of time without any deterioration of the electrodes occurring. Switching is acceptable for given applications and may be improved. Stability of the two states (transparent and non-transparent) is fine. The present modulator comprises typically colored particles, being capable of moving from a first location (e.g. storage area) to a second location. Thereto the particles are charged or chargeable. Also the particles may be relatively small, e.g. smaller than 900 nm, preferably smaller than 400 nm, and larger than 30 nm, preferably larger than 40 nm, such as 60-200 nm. For improved movement and control smaller particles are preferred. For imparting movement at least two electrodes are provided. In some embodiments, two electrodes may be found sufficient for each substrate. The electrodes occupy an area at an inner side of the substrates, i.e. towards the fluid. One electrode may relate to an electrically neutral (or ground) electrode. For controlling movement of colored particles and stability of a status (transparent or colored) in a device a driver circuit for applying an electro-magnetic field to the modulator may be provided.

The present modulator is characterized in that the electrodes comprise an electrically conducting material with a resistivity of less than 100 nΩm (at 273K), the at least two electrodes are adapted to provide an electrical force between said electrodes parallel to the substrates when switching to a non-transparent state, and the at least two electrodes are adapted to provide an electrical force between said electrodes in an orientation with respect to the substrates when switching to a transparent state, which orientation is selected from parallel to the substrates, perpendicular to the substrates, diagonal with respect to the substrates, and combinations thereof, a power provider in electrical connection with the at least two electrodes, wherein the power provider is adapted to provide a waveform power, wherein at least one of amplitude, frequency, and phase is adaptable, and wherein the electrodes are in fluidic contact with the fluid, and wherein electrodes cover 1-70% of the substrate surface. This provides movement of the particles. Also the modulator can now be safely operated with or without electro corrosion. The present modulator typically has a distance between the first and second substrate smaller than 30 μm, such as 15 μm. It may comprise one or more pixels, typically a multitude of pixels, the pixel being a single optically switchable entity, which may vary in size. The substrates enclose a volume, which may be a pixel, at least partly. The distance may be much smaller than typical prior art devices. The present design, allowing lateral movement, as well as a relatively small distance provide a much better control of the movement of the particles, a good control of the electrical field being almost insensitive to imperfections of the materials used, such as perturbations, no production issues when outlining the substrates, and providing a good stability of the two statuses. Further the design is much more robust, such as in that electrodes remain mostly intact over longer periods of time. Also good optical properties are provided. Even further, the present design allows for stacking, contrary to prior art devices, such as is further detailed below.

For moving the particles around an appropriate electrical field is applied to the electrodes, e.g. attracting or repelling the charged particles. Such is done for each and every electrode where an effect is envisaged; other parts may have no electrical field. In this way each individual part, typically a pixel, can be addressed independently and as a consequence each individual part can be in a transparent (only particles visible on an electrode 16) or in a "colored" mode. Likewise an electrode can as a whole be at a zero (0) voltage, or at a positive or negative voltage, thereby contributing to the electrical field. In a similar fashion the electrical field can be refreshed now and then.

The term "optical" may relate to wavelengths visible to a human eye (about 380 nm-about 750 nm), where applicable, and may relate to a broader range of wavelengths, including infrared (about 750 nm-1 μm) and ultraviolet (about 10 nm-380 nm), and sub-selections thereof, where applicable.

Important is that the present pixel and device are fully adaptable, e.g. to changing light conditions.

The present device may comprise pixels therein, which pixels can be changed, i.e. within a few seconds.

In the present modulator typically one type of colored particles may be present, such as selected from red, green, and blue, or from magenta, cyan, and yellow, as well as combinations thereof. A modulator may change from white (transparent) to one of the colors, and vice versa, upon change of an electric field. In addition black particles may be present, but not necessarily, which would complicate the design somewhat. For black/transparent applications only black particles are typically present.

For full color applications, a stack of two or three modulators could provide most or all colors, respectively. Such a stack is considered impossible with at least some other layouts, as in such a case either black or white particles would always be visible; also there is no option to provide further typically considered features as haze, contrast, warm/cold effect, complementary contrast, simultaneous contrast, saturation, intensity, etc. For the present pixel all these features can be adapted and controlled very precisely.

The present modulator comprising only black particles is found to have a high black contrast.

The present device may comprise a driver circuit for changing appearance of (individual) pixels by applying an electro-magnetic field. As such also appearance of the display device, or one or more parts thereof, may be changed.

The present electronic device may comprise a unique code for identification. As such every electronic device can be identified individually.

The present device, including substrates, protective layer, etc. may be relatively thin and can therefore in principle be applied to e.g. a stack of devices. The present display has a thickness less than 0.1 cm, preferably a thickness of 10

μm-500 μm, more preferably a thickness of 15 μm-300 μm, even more preferably a thickness of 25 μm-200 μm, such as 50 μm-100 μm. A thickness may vary, e.g. depending on a number of devices applied. As such the present display device (in a transparent mode) is not or hardly visible for a human eye.

Especially for smaller devices also a power supply may be provided, typically a battery.

For better understanding of the underlying technology, reference is made to prior filed (Jun. 7, 2013) Dutch Patent application NL2010936. The teachings and examples of the above document are hereby incorporated by reference.

DETAILED DESCRIPTION OF THE DRAWINGS AND THE PRESENTLY PREFERRED EMBODIMENTS

The present disclosure relates in a first aspect to an optical modulator.

In an exemplary embodiment of the optical modulator the waveform power can be characterized by a frequency of 0.01-100 Hz, a variation in amplitude of 5-100% of a maximum amplitude, wherein the maximum amplitude is a maximum voltage operation, and in a variation in phase (phase shift) of 0-180°. Depending on ink characteristics, low frequency waveforms (0.01-1 Hz) are found to increase the optical modulator transparency. High frequency waveforms (70-100 Hz) are found to maintain or decrease the optical modulator transparency. Low waveform amplitudes (20-50%) are found to maintain a low transparency level. High waveform amplitudes (80-100%) are found to maintain a high transparency level.

In an exemplary embodiment of the optical modulator, the at least two electrodes form an interdigitated pattern, preferably on both substrates. The fingers of the interdigitated pattern may further comprise at least one branch, typically at least one branch at either side thereof, such as branches with a spacing of 0.01-3 cm.

In an exemplary embodiment of the optical modulator the interdigitated pattern is a regular 2-dimensional pattern, wherein each finger comprises at least one waveform, wherein the waveform has an amplitude A and a width W, and wherein fingers are at a distance d from one and another, i.e. wherein fingers are separated. It has been found that higher order images are formed due to the presence of the electrodes on the substrate. In order to minimize these secondary images the fingers of the interdigitated electrodes are preferably not straight (see also example).

In an exemplary embodiment of the optical modulator the waveform sinusoidal shape symmetry is broken, such as wherein at a maximum of the waveform shape a downward curved first protrusion 21 is provided, and wherein at a minimum of the waveform shape a downward or upward curved second protrusion 22 is provided. By doing so the higher order images are reduced significantly. Compared to a straight pattern a brightness is decreased from about 180 to 60 (on an 8-bit grey scale).

In an exemplary embodiment of the optical modulator the first protrusion has a larger width than the second protrusion. It has been found that therewith higher order images are even further reduced.

In an exemplary embodiment of the optical modulator a width W of the waveform is 50-750 μm, such as 100-500 μm.

In an exemplary embodiment of the optical modulator an amplitude A of the waveform is 10-500 μm, such as 20-400 μm.

In an exemplary embodiment of the optical modulator a distance d between the fingers is 10-500 μm, preferably 10-100 μm, such as 20-70 μm.

In an exemplary embodiment of the optical modulator a width of the first protrusion is 10-50 μm, such as 20-30 μm.

In an exemplary embodiment of the optical modulator a width of the second protrusion is 10-50 μm, such as 20-30 μm.

In an exemplary embodiment of the optical modulator a width of the first protrusion is 2-4 times the width of the second protrusion, In an exemplary embodiment of the optical modulator a height h of the first protrusion is 5-20 μm, such as 10-15 μm.

In an exemplary embodiment of the optical modulator a height h of the second protrusion is 5-20 μm, such as 10-15 μm.

In an exemplary embodiment of the optical modulator a form of the protrusion is part of a circle or oval.

In an exemplary embodiment of the optical modulator a transition from waveform to protrusion and vice versa is gradual.

In an exemplary embodiment of the optical modulator the power provider is adapted to provide pulses and to refrain from providing pulses during intervals therein between, such as pulses of 0.1-10 sec/min, and intervals of 0.1-1000 seconds, preferably of 5-600 seconds.

In an exemplary embodiment the optical modulator may comprise a controller, wherein the controller is adapted to maintain an alternating electrical current with a size of the positive current being 0.9-1.1 times a size of the negative current, preferably 0.95-1.05 times a size thereof, more preferably 0.99-1.01 times a size thereof, such as 0.995-1.005 times a size thereof, and adapted to vary an electrical potential in accordance with the electrical current.

In an exemplary embodiment the optical modulator may comprise at least two alignment markers on each substrate for aligning substrates, preferably such that electrodes of the first substrate are fully aligned with electrodes of the second substrate, more preferably that electrodes of the first substrate project on the electrodes of the second substrate.

In an exemplary embodiment of the optical modulator electrodes comprise copper, silver, gold, aluminium, graphene, titanium, indium, and combinations thereof, preferably copper.

In an exemplary embodiment of the optical modulator the power provider is operated at an AC frequency for switching to a transparent state of 10-100 Hz.

In an exemplary embodiment of the optical modulator the power provider is operated at an AC frequency for switching to a non-transparent state of less than 1 Hz, such as 30-500 mHz, typically in case of slow moving particles.

In an exemplary embodiment of the optical modulator within one switching cycle, the power provider is operated at an AC frequency for switching to a transparent state of 10-100 Hz, in combination with the power provider at an initial stage of the cycle being operated at a positive or negative voltage when switching to a transparent state and in combination with the power provider being at a final stage of the cycle operated at a negative or positive voltage when switching to a non-transparent state. In between the initial and final stage the direct positive or negative voltages are absent. Therewith good control, good stability, and low power consumption are achieved, amongst others.

In an exemplary embodiment of the optical modulator the fluid comprises counter ions for compensating a charge on the particles.

In an exemplary embodiment the optical modulator may comprise a temperature sensor and/or controller, wherein the temperature sensor is in contact with the controller, wherein the controller is in contact with the power provider, and wherein the controller as adapted to compensate output of the power provider in view of the temperature measured by the temperature sensor.

In an exemplary embodiment the optical modulator may comprise a stack of optical modulators, wherein a number of optical modulators is from 2-10, preferably 3-5. Each modulator in the stack may comprise different colored particles, and (different) mixtures thereof. Therewith a full color device may be provided. In an example thereof a first substrate of a second modulator and a second substrate of a first modulator are the same, i.e. are combined into one substrate. Such is a big advantage of the present device, therewith reducing the number of substrates in a stack, improving contrast and transparency, and reducing complexity. In an example the fluid is transparent. The above examples may be combined in full or in part.

In an exemplary embodiment of the optical modulator optionally at least one substrate 11, 12 of a first optical modulator is the same as a substrate 11, 12 of at least one second optical modulator.

In an exemplary embodiment of the optical modulator electrodes each individually have a width of 1-30 µm, preferably 3-10 µm, such as 5-8 µm.

In an exemplary embodiment of the optical modulator electrodes each individually have a thickness of 0.1-200 µm, preferably 1-25 µm, more preferably 1.5-15 µm, such as 2-5 µm.

In an exemplary embodiment of the optical modulator electrodes comprise an electrical conducting material with a resistivity of less than 30 nΩm (@273K), preferably less than 20 nΩm.

In an exemplary embodiment of the optical modulator spacers are provided in between the first and second substrates, preferably 1-10000/mm$^2$, such as 5-100/mm$^2$. In an example the first and second substrate are spaced apart by (glass) beads having a diameter of 2-30 µm, preferably 14-16 µm, such as 15 µm. The randomly distributed beads, preferably glass beads or polymer beads, define a distance between the substrates very accurately, provide strength and flexibility, and hardly disturb movement of the colored particles. The beads can be produced such that a very homogenous distribution of sizes thereof is obtained, e.g. with an accuracy of better than 0.1 µm. The average volume of beads is 0.1-15 vol. % relative to the total volume, i.e. they occupy only small volume. The beads may be colored or black.

In an exemplary embodiment of the optical modulator the electrodes cover 2-30% of the substrate surface, preferably 3-20%, more preferably 4-10%, such as 5-8%.

In an exemplary embodiment of the optical modulator a counterion is selected form sulfate, chloride, bromide, and combinations thereof.

In an exemplary embodiment of the optical modulator an electrical potential is between −60-+60V, preferably −20-+20V, more preferably −15-+15V. It is noted that in view of the small distance between first and second electrode the electrical field (V/µm) is much higher compared to prior art devices, typically 5-20 times higher. It has been found that fluid behavior is better at a higher voltage, e.g. in terms of flow, and switching time. It is preferred to have particles charge stabilized. As such a better performance e.g. in view of distribution over the field electrode, and faster and better controllable switching times are achieved.

In an exemplary embodiment of the optical modulator an electrical current is between −100-+100 µA, preferably −30-+30 µA, more preferably −25-+25 µA.

In an exemplary embodiment of the optical modulator a substrate material is selected from glass, and polymer.

In an exemplary embodiment of the optical modulator the nanoparticles/microparticles may comprise a coating on a pigment, and preferably comprising a core.

In an exemplary embodiment of the optical modulator substrates (11, 12) are aligned, and/or electrodes (13, 14) are aligned.

In an exemplary embodiment of the optical modulator the fluid is an apolar fluid with a dielectric constant less than 15, such as branched or unbranched $C_8$-$C_{60}$ alkanes, branched or unbranched $C_8$-$C_{60}$ alkenes, branched or unbranched $C_6$-$C_{60}$ alcohols, branched or unbranched $C_6$-$C_{60}$ alkanols, branched or unbranched $C_8$-$C_{60}$ ketones, branched or unbranched $C_8$-$C_{60}$ aldehydes, silicon oils, and combinations thereof. In case of higher alkanes, alkenes, alcohols, alkanols, ketones, and aldehydes, branched molecules are preferred. Examples are squalane ($C_{30}H_{62}$) and squalene ($C_{30}H_{60}$).

In an exemplary embodiment of the optical modulator a size of the nanoparticles is from 20-1000 nm, preferably 20-300 nm, more preferably smaller than 200 nm. The diameter of the particles is defined herein to be the largest distance that can be formed between two opposite parallel lines tangent to its boundary. It has been found that these particles provide a good distribution of particles over the present (field) electrode. In view of an electro-magnetic field to be applied the present particles are being chargeable or charged. Likewise magnetic particles may be used. It is preferred to provide a stable dispersion; as such the above sizes are preferred. The particle size is considered to be a measure of an averaged diameter thereof. Light scattering can be used to determine a particle size distribution, such as using a Malvern Zetasizer Nano Range. It has further been found that smaller particles attribute significantly to the present characteristics of the pixels.

In general the reflectance of the present modulator is high, typically more than 50% is reflected. As a result for black particles a transmittance of >65% is achieved, and for sophisticated modulators values of 71% or more are achieved. For colored particles (such as CMY) a transmittance of >80% is easily achievable, whereas levels of >85% or even >90% have been reached. Especially in view of stacked modulators such is very relevant.

In an example the open (non-electrode) area is more than 70%, such as 80% transparent, preferably more than 90%; typically transparency is determined at a wavelength of 550 nm. The open area may be made of the substrate, such as glass and a suitable polymer, such as poly carbonate (Perspex) and PET. The material may have a thickness of 0.01 mm-2 mm, preferably 0.025 mm-1 mm, such as 0.05-0.5 mm. If a flexible pixel and/or display are required it is preferred to use a thin material. If some strength is required, a thicker material is preferred. It has been found that with such transparency energy consumption can even be further reduced. Such provides huge advantages, e.g. in terms of usage, reduced need for loading devices, smaller charge storing devices, etc. Especially when a power grid is not available such will be appreciated.

In an example the modulator may be provided in a flexible polymer, and the remainder of the device may be provided in glass. The glass may be rigid glass or flexible glass. If required a protection layer is provided. If more than one color is provided, more than one layer of flexible polymer may be provided. The polymer may be poly ethylene naphthalate (PEN), poly ethylene terephthalate (PET) (optionally having a SiN layer), polyethylene (PE), etc. In a further example the device may be provided in at least one flexible polymer. As such the modulator may be attached to any surface, such as by using an adhesive.

In an exemplary embodiment of the optical modulator the particles are adapted to absorb light with a wavelength of 10 nm-1 mm, such as 400-800 nm, 700 nm -1 µm, and 10-400 nm, and/or are adapted to absorb a part of the light with a wavelength-range falling within 10 nm-1 mm (filter), and combinations thereof.

In an exemplary embodiment of the optical modulator a distance between the first and second substrate is smaller than 500 µm, preferably smaller than 200 µm, more preferably less than 100 µm, even more preferably less than 50 µm, such as less than 30 µm.

In an exemplary embodiment of the optical modulator electrodes are for storing the particles.

In an exemplary embodiment of the optical modulator a charge on the particles is 0.1 e to 10 e per particle ($5*10^{-7}$-0.1 $C/m^2$).

In an exemplary embodiment of the optical modulator the coating of the particles is made from a material selected from conducting and semi-conducting materials.

In an exemplary embodiment of the optical modulator the fluid is present in an amount of 1-1000/$gm^2$, preferably 2-75/$gm^2$, more preferably 20-50/$gm^2$, such as 30-40/$gm^2$. It is a big advantage that with the present layout much less fluid, and likewise particles, can be used.

In an exemplary embodiment of the optical modulator the particles are present in an amount of 0.01-70/$gm^2$, preferably 0.02-10/$gm^2$, such as 0.1-3/$gm^2$.

In an exemplary embodiment of the optical modulator the particles have a color selected from cyan, magenta, and yellow, and from black and white, and combinations thereof.

In an exemplary embodiment of the optical modulator the fluid comprises one or more of a surfactant, an emulsifier, a polar compound, and a compound capable of forming a hydrogen bond.

In an exemplary embodiment of the optical modulator the fluid has a relative permittivity $\varepsilon_r$ of less than 100, preferably less than 10, such as less than 5.

In an exemplary embodiment of the optical modulator a dynamic viscosity of less than 0.5 Pa*s, preferably less than 100 mPa*s, such as from 0.2-10 mPa*s, e.g. 0.5-5 mPa*s, e.g. 1-2 mPa*s, preferably a dynamic viscosity of less than 1 mPa*s.

In an exemplary embodiment of the optical modulator the optical modulator comprises $10^{-8}$-50 pixels/$mm^2$, preferably $10^{-6}$-16 pixels/$mm^2$, more preferably $5*10^{-4}$-1 pixels/$mm^2$, even more preferably $1*10^{-3}$-0.11 pixels/$mm^2$.

In an exemplary embodiment of the optical modulator the controller is adapted to switch individual pixels.

In an exemplary embodiment of the optical modulator the power provider is a combined AC/DC provider.

In an exemplary embodiment of the optical modulator may comprise a driver circuit that is adapted to provide a time varying electro-magnetic field.

In an exemplary embodiment of the optical modulator the waveform power is characterized by a frequency of 0.01-100 Hz, a variation in amplitude of 5-100% of a maximum amplitude, wherein the maximum amplitude is a maximum voltage operation, and in a variation in phase (phase shift) of 0-180°.

In a second aspect the present disclosure relates to a product comprising an optical modulator as described according to any embodiment herein, wherein the product is selected from a window blind, a signage system, an outdoor display, an electronic label, a secondary screen, a smart glass, a color panel, and a screen.

In a third aspect the present disclosure relates to a method of operating the present optical modulator comprising applying an electrical field, moving particles from an electrode towards the fluid, applying a reverse electrical field, moving particles spread out towards the electrode, using an alternating current with an electrical potential between −220 V and +220 V, and an electrical current between −100 µA and +100 µA, wherein electron consumption between the two phases is substantially equal, thereby balancing positive and negative current flows, wherein during a first phase the electrode material is partly dissolved in the fluid, and wherein during a first phase +180 degrees dissolved electrode material is redeposited on the electrode. Such is typically not the case for prior art devices wherein for instance only a potential is controlled and balanced, but no attention is paid to balancing.

In an exemplary embodiment of the present method the dissolved electrode is deposited on an oppositely charged electrode, hence the material may be deposited on another electrode (compared to the one which provided the material in the first place).

The device and method are further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims.

The device and method, although described in detailed explanatory context, may be best understood in conjunction with the accompanying examples and figures.

Figure 1A:
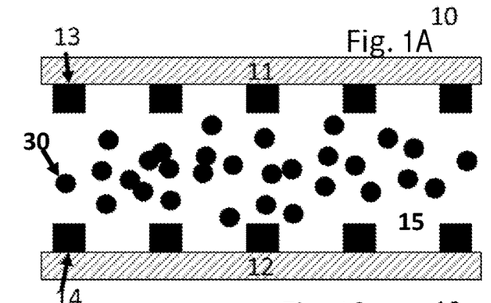
FIG. 1A-1C show side views of the present optical modulator.

FIG. 1A shows a side view of the optical modulator, in order to switch the device to an 'on state' in a first instance, P1, a potential +V1 is applied to each micro wire electrode on the top substrate, while a negative voltage is applied to each micro wire electrode of the bottom plate. In the first instance, P1, the difference in potential causes particles to flow to the vicinity of the microwire electrodes of the top substrate, where the particles will substantially align with the top microwire electrodes. Between the substrates, copper ions from a top copper microwire electrode are being dissolved in the ionic liquid of the display or smart window, and the dissolved copper ions progressively flow to the corresponding aligned copper microwire electrode of the bottom substrate, where the copper ions progressively deposit on the aligned copper microwire electrode of the bottom substrate.

In a second instance, P2, of the 'on state', the voltages of the top electrode copper microwires and bottom electrode copper microwires are reversed in contrast to the instance of P1. In the instance P2, the voltage of each microwire electrode on of the top substrate are now supplied with a negative potential −V1 while the voltages of the aligned copper microwires of the bottom substrate are supplied with a positive potential. The difference in potential will cause the particles of the window or display to flow to the vicinity of the copper microwire electrodes of the bottom substrate, where the particles will agglomerate and substantially align with the bottom microwire electrodes. Between the substrates, copper ions from the bottom copper microwire electrode are dissolved in the ionic liquid of the display or smart window, and the dissolved copper ions progressively flow to the corresponding aligned copper microwire electrode of the top substrate, where the copper ions progressively deposit on the aligned copper microwire electrode of the top substrate. A balancing electrolysis current is obtained by continuously switching the polarity of the top and bottom electrode copper microwires. Between the two instances the corrosion current between the two substrates is balanced or substantially (>95%) balanced, i.e., as corrosion rate of an electrode of the top plate occurs there is a balancing deposition of copper on the bottom electrode between each instance of time, P1 and vice versa in instance P2. Therefore, the particles are transitioning or migrating continuously between top and bottom electrode, and the display or smart window is always in the on state while the dynamic electrolysis current between the top and bottom electrode is constant thus there is no or a negligible net loss of copper electrode microwire material on the top and bottom substrates.

The electrodes may be in the form of micro wires made of copper embedded in a polymer-based substrate. During operation of the device an electrochemical current is produced through the display between the two substrates, with dissolution of copper ions at one end and the migration of copper ions to the other end. In order to drive the display a new electrode configuration between the two substrates is required for attaining a balance in copper electrode dissolution and copper electrode deposition between the two substrates i.e., a balance of the current flowing through the display is required. The challenge lies in how to switch the display while maintaining balance of the electrochemical current. This can be achieved by a new design of the electrode configuration of the display.

Figure 1B:
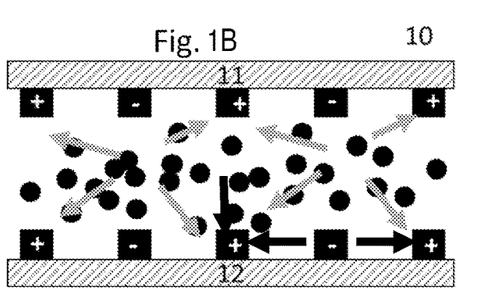

To attain the 'off state' the top and bottom substrates are arranged as above for the 'on state'. However, on the top substrate, at an instance, P3 (FIG. 1B), the potential applied to the first copper microwire is +V2 and the next immediate neighboring microwire has an opposite potential −V2 etc., as shown in FIG. 1B. This creates an alternating voltage on the same substrate. Similarly, each copper microwire electrode of the bottom substrate has the same potential as its directly opposite counterpart microwire electrode of the top substrate as shown in FIG. 1B. Particles migrate diagonally and laterally between the top and bottom substrate and diffusion of particles into the visible aperture of the display contributes to the closed, opaque state of the display. Concurrently, copper ions go into solution at the top copper microwire electrodes having a positive potential on the same substrate and the ions progressively flow to the bottom copper microwire electrodes. The migrating copper ions re-deposit on the microwire having the negative potential.

Figure 1C:
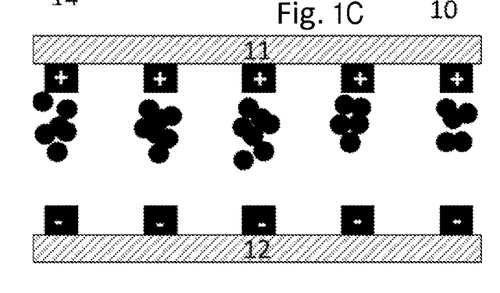
Figure 2A:
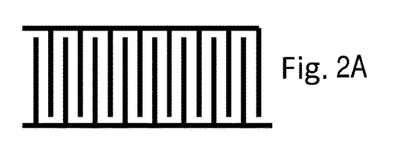
FIGS. 2A-2E show plan views of interdigitated electrodes from the top and bottom substrate.
Figure 2B:
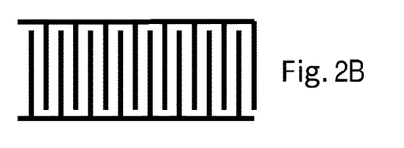
Figure 2C:
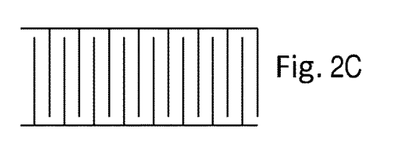
Figure 2D:
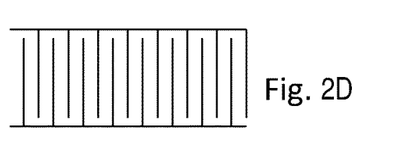

At an instant T4 (FIG. 1C), the voltages are alternated in contrast to FIG. 1B. The potential applied to the first copper microwire of the top substrate is −V2 and the next immediate neighboring microwire has an opposite potential +V2 etc., as shown in FIG. 1C. This creates an alternating voltage on the same substrate. Similarly, each copper microwire electrode of the bottom substrate has the same potential as its directly opposite counterpart microwire electrode of the top substrate as shown in FIG. 2B. Concurrently, copper ions go into solution at the bottom copper microwire electrodes having a positive potential on the same substrate and the ions progressively flow toward the top copper microwire electrodes. The migrating copper ions re-deposit on the microwire having the positive potential. The AC drive cycle may be implemented by using an interdigitated line configuration combining the top and bottom electrode configuration shown in plan view in FIG. 2A-2E.

By using this AC drive cycle between top and bottom substrates, diagonal and lateral electric fields are generated between the two substrates thereby causing haphazard diffusion of the particles thereby creating the closed state of the display. Electro corrosion process occurs dynamically in the off state as well with the AC driving of the display or smart window. In order to drive the display or smart window, a new electrode configuration between the two substrates is required for attaining a balance in copper electrode dissolution in the display liquid and copper electrode deposition on the two substrates i.e., a balance of the current flowing through the display is required. The challenge lies in how to switch the display while maintaining balance of the electrochemical current through the display or smart window. This can be achieved by a new design of the electrode configuration of the display.

This is achieved by the configuration shown in FIG. 1A. A conducting metallic electrode pattern, such as a microwire mesh, arranged on the top substrate is completely or substantially aligned with a conducting metallic electrode pattern on the bottom substrate. The conducting metallic electrode pattern may be deposited on a glass substrate or a microwire mesh may be embedded in a plastics substrate.

Figure 2E:
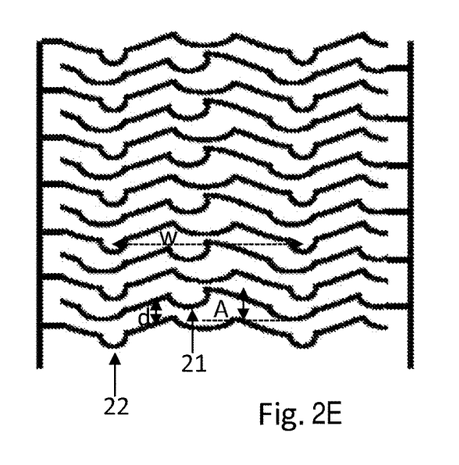

In view of FIG. 2E the following is an example of creating such an electrode pattern. Therein each electrode design is composed of 2 parallel lines being repeated. The 2 specific parallel lines are initiated by the same sinusoidal curve. In one embodiment, the so called Rhine1 design is made of sinusoidal curve of amplitude 340 µm and wavelength of 340 µm. In another embodiment, the so called Rhine2 project is made of sinusoidal curve of amplitude 340 µm and a wavelength of 640 µm. The line gap is preferably set to 70 µm. Then for each curve, peaks of the sinusoidal curve are detected (with a 99.9% tolerance). From those coordinates (2× coordinates corresponding to the peaks in angle 0 and angle 180, lowest peak and highest peak), 4 criteria are used: S1, S2, S3 and S4.

On the first of the 2 curves:

S1 corresponds to a number of µm to retrieve to the x coordinate of the high peak, S2 corresponds to a number of µm to add to the x coordinate of the high peak, S3 corresponds to a number of µm to retrieve to the x coordinate of the low peak, S4 corresponds to a number of µm to add to the x coordinate of the low peak, The portion of the sinusoidal curve between S1-S2 and S3-S4 on the first curve only is replaced by an oval shape pointing downward of amplitude of the sinusoidal curve. For the second parallel sinusoidal curve, a similar approach is used. The values of S1, S2, S3 and S4 are re-used but here attributed differently and as followed:

S2 corresponds to a number of µm to retrieve to the x coordinate of the high peak, S3 corresponds to a number of µm to add to the x coordinate of the high peak, S1 corresponds to a number of µm to retrieve to the x coordinate of the low peak, S4 corresponds to a number of µm to add to the x coordinate of the low peak. This approach was used to limit the number of possibilities and gave us the possibilities to compute more randomized system.

The oval shape is pointing downwards in the figure. It is also possible to point the oval shape always within the sinusoidal curve. A 1000×1000 μm pattern line image is created following the rules mentioned above. Lines are plotted in black on a white background to simulate an open state. An FFT function (Fast Fourier Transform) is applied to each images. Thereafter a filter is applied on the FFT image. Every pixel value below 180 is set to 0, Black. Every value above on the 8 bit scale is then replaced by the proportion of the value within a new 0-256 scale where consider the previous value as part of 180-256 scale. This reveals the diffraction pattern. The center of the square image FFT represents the "initial image" and therefore this pixel is set to 0 too. Then the FFT image histogram is analyzed and the main criteria looked at is the highest grey value in that image. The higher the grey value, the stronger the diffraction effect will be. So then all designed all classified according to this maximum grey value.

Figure 3A:
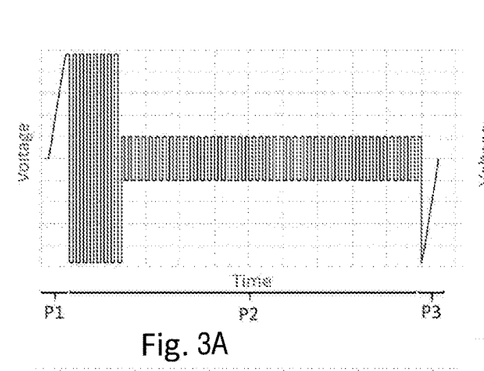
FIGS. 3A-3C show opening and closing pulses.
Figure 3B:
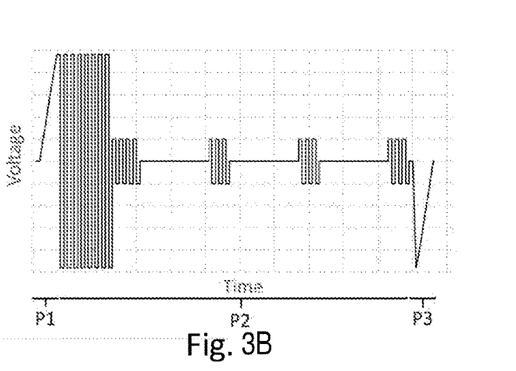
Figure 3C:
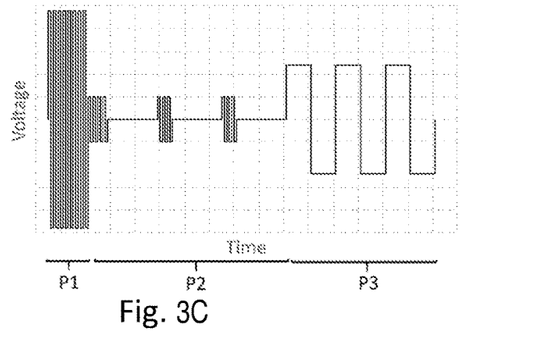

Schematics representative of the electrical signal that can be added to one set of electrodes are shown in FIGS. 3A-3C. The other electrode set on the interdigitated system will have the opposite waveform. The waveform is composed of 3 different phases:

P1: the opening phase
P2: maintaining the opening state phase
P3: closing phase

Depending on the ink properties, P1 phase can be applied in various ways: increase of potential in DC mode (for fast ink) or a high frequency AC signal (>10 Hz) (for the slow ink).

P2 phase is composed of a high frequency signal (>10 Hz) that also could be interrupted for a definitive amount of time corresponding with the ink stability. During that phase the potential could be reduced comparable with the P1 phase. Indeed it may require a high voltage to bring the particles to the electrode (a need to create sufficient electric field force for the particles that are further away of the electrode). When the particles are close to the electrode, then a lower potential can be applied to obtain locally the same attraction force on the particles.

P3 phase is the closing phase. With a slow ink, a low frequency AC signal (less than 1 Hz) can be applied. The potential will also be reduced compared to P1 as it is not needed to travel the particles till the opposite electrodes. For a fast ink and with P1 DC, the closing will be the exact opposite of P1 phase in order to maintain the balance in current.

It should be appreciated that for commercial application it may be preferable to use one or more variations of the present system, which would similar be to the ones disclosed in the present application and are within the spirit of the invention.

REFERENCE NUMBERS 10 optical modulator
11 first substrate
12 second substrate
13 first electrode
14 second electrode
15 fluid
21 first protrusion
22 second protrusion
30 nanoparticle/microparticle
A amplitude of wave form
d distance between fingers
w width of waveform

The invention claimed is:

1. An optical electrophoretic modulator for switching between a transparent state and a non-transparent state and vice versa, the optical electrophoretic modulator comprising:
   first and second substrates, wherein the first and second substrates are optically transparent,
   at least two electrodes on each of the first and second substrates, the at least two electrodes being provided at an internal side of the respective first or second substrate,
   a fluid provided in between the first and second substrates, the fluid comprising nanoparticles and/or microparticles, wherein the particles are electrically charged or chargeable, and wherein the particles are adapted to absorb light,
   a connection for applying an electro-magnetic field to the at least two electrodes, wherein the applied electro-magnetic field to the electrodes provides movement of the nanoparticles and/or microparticles from a first electrode to a second electrode of the at least two electrodes and vice versa,
   wherein the at least two electrodes comprise an electrically conducting material with a resistivity of less than 100 nΩm at 273 K,
   wherein, when switching to a non-transparent state, the at least two electrodes are adapted to provide an electrical force therebetween parallel to the first and second substrates, and
   wherein, when switching to a transparent state, the at least two electrodes are adapted to provide an electrical force therebetween in an orientation with respect to the first and second substrates, wherein the orientation is selected from parallel to the first and second substrates, perpendicular to the first and second substrates, diagonal with respect to the first and second substrates, and combinations thereof,
   a power provider in electrical connection with the at least two electrodes, wherein the power provider is adapted to provide a waveform AC power, wherein at least one of amplitude and phase is adaptable,
   wherein the at least two electrodes are in fluidic contact with the fluid, and
   wherein two of the at least two electrodes form an interdigitated pattern on both of the first and second substrates, wherein the interdigitated pattern comprises fingers in a regular 2-dimensional pattern, and wherein each finger comprises at least one waveform shape.

2. The optical electrophoretic modulator according to claim 1, wherein the at least two electrodes cover 1-30% of a substrate surface.

3. The optical electrophoretic modulator according to claim 1, wherein a waveform shape symmetry is broken.

4. The optical electrophoretic modulator according to claim 1, wherein the power provider is adapted to provide pulses and to refrain from providing pulses during intervals therein between.

5. The optical electrophoretic modulator according to claim 1, further comprising a controller, wherein the controller is adapted to maintain an alternating electrical current with a size of a positive current being 0.9-1.1 times a size of a negative current, and adapted to vary an electrical potential in accordance with the electrical current.

6. The optical electrophoretic modulator according to claim 1, further comprising at least two alignment markers on each first and second substrates for aligning the first and second substrates, such that the at least two electrodes of the first substrate are fully aligned with the at least two electrodes of the second substrate.

7. The optical electrophoretic modulator according to claim 1, wherein the power provider is operated at an AC frequency of 10-100 Hz for switching to a transparent state, and/or the power provider is operated at an AC frequency of less than 1 Hz for switching to a non-transparent state, or
wherein, within one switching cycle, the power provider is operated at an AC frequency of 10-100 Hz for switching to a transparent state, in combination with the power provider initially being operated at a positive or negative voltage when switching to a transparent state and in combination with the power provider being finally operated at a negative or positive voltage when switching to a non-transparent state.

8. The optical electrophoretic modulator according to claim 1, further comprising a temperature sensor and a controller, wherein the temperature sensor is in contact with the controller, wherein the controller is in contact with the power provider, and wherein the controller as adapted to compensate output of the power provider in view of the temperature measured by the temperature sensor.

9. The optical electrophoretic modulator according to claim 1, wherein the fluid comprises an apolar fluid with a dielectric constant less than 15 selected from the group consisting of: branched or unbranched $C_8$-$C_{60}$ alkanes, branched or unbranched $C_8$-$C_{60}$ alkenes, branched or unbranched $C_6$-$C_{60}$ alcohols, branched or unbranched $C_6$-$C_{60}$ alkanols, branched or unbranched $C_8$-$C_{60}$ ketones, branched or unbranched $C_8$-$C_{60}$ aldehydes, silicon oils, and combinations thereof.

10. The optical electrophoretic modulator according to claim 1, wherein a size of the nanoparticles is from 20-1000 nm.

11. The optical electrophoretic modulator according to claim 1, wherein the particles are adapted to absorb light with a wavelength of 10 nm-1 micron.

12. The optical electrophoretic modulator according to claim 1, wherein a distance between the first and second substrates is smaller than 500 μm.

13. The optical electrophoretic modulator according to claim 1,
wherein a dynamic viscosity of the fluid is 500 mPa·s or less.

14. The optical electrophoretic modulator according to claim 1, wherein the fluid has a relative permittivity $\varepsilon_r$ of less than 100.

15. The optical electrophoretic modulator according to claim 1, wherein the waveform AC power is characterized by a frequency of 0.01-100 Hz, a variation in amplitude of 5-100% of a maximum amplitude, wherein the maximum amplitude is a maximum voltage operation, and a variation in phase (phase shift) of 0-180°.

16. The optical electrophoretic modulator according to claim 1, wherein at a maximum of the waveform shape a downward curved first protrusion is provided, and wherein at a minimum of the waveform shape a downward or upward curved second protrusion is provided.

17. The optical electrophoretic modulator according to claim 16, wherein the first protrusion has a larger width than the second protrusion.

18. The optical electrophoretic modulator according to claim 16,
wherein a width W of the waveform is 50-750 μm, and/or
wherein an amplitude A of the waveform is 10-500 μm, and/or
wherein a distanced between the fingers is between 10-500 μm, and/or
wherein a width of the first protrusion is 10-50 μm, and/or
wherein a width of the second protrusion is 10-50 μm, and/or
wherein a width of the first protrusion is 2-4 times the width of the second protrusion, and/or
wherein a height h of the first protrusion is 5-20 μm, and/or
wherein a height h of the second protrusion is 5-20 μm, and/or
wherein a form of the protrusion is part of a circle or oval.

* * * * *

UNITED STATES PATENT AND TRADEMARK OFFICE
CERTIFICATE OF CORRECTION

PATENT NO. : 10,935,866 B2
APPLICATION NO. : 16/834588
DATED : March 2, 2021
INVENTOR(S) : Romaric Mathieu Massard Page 1 of 1

It is certified that error appears in the above-identified patent and that said Letters Patent is hereby corrected as shown below:

In the Claims

Column 16, Claim 18, Line 27, delete "distanced" and replace with "distance d"

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*